(12) United States Patent
Tsuchiya

(10) Patent No.: US 7,177,745 B2
(45) Date of Patent: Feb. 13, 2007

(54) STEERING CONTROL APPARATUS

(75) Inventor: Yoshiaki Tsuchiya, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 122 days.

(21) Appl. No.: 10/998,132

(22) Filed: Nov. 29, 2004

(65) Prior Publication Data

US 2005/0121252 A1 Jun. 9, 2005

(30) Foreign Application Priority Data

Dec. 4, 2003 (JP) ............................. 2003-406234

(51) Int. Cl.
B62D 5/04 (2006.01)

(52) U.S. Cl. ..................... 701/41; 701/42; 180/446

(58) Field of Classification Search .................... None
See application file for complete search history.

(56) References Cited

U.S. PATENT DOCUMENTS

| 4,730,686 | A | * | 3/1988 | Shimizu ................ 180/446 |
| 4,745,985 | A | * | 5/1988 | Nakayama et al. ......... 180/422 |
| 4,834,203 | A | | 5/1989 | Takahashi et al. |
| 4,909,343 | A | * | 3/1990 | Mouri et al. ............. 180/422 |
| 4,979,114 | A | | 12/1990 | Oshita et al. |
| 5,201,818 | A | * | 4/1993 | Nishimoto .............. 180/446 |
| 5,668,722 | A | * | 9/1997 | Kaufmann et al. ........... 701/41 |
| 6,612,394 | B2 | * | 9/2003 | Wessman ................ 180/446 |

| 2001/0017229 | A1 | | 8/2001 | Kada et al. |
| 2002/0060538 | A1 | * | 5/2002 | Hara et al. .............. 318/432 |

FOREIGN PATENT DOCUMENTS

| EP | 0 411 398 A2 | 2/1991 |
| EP | 0 566 168 A2 | 10/1993 |
| EP | 1 288 108 A1 | 3/2003 |
| JP | A 63-312268 | 12/1988 |
| JP | A 01-309873 | 12/1989 |
| JP | A 2-197465 | 8/1990 |
| JP | A 05-208684 | 8/1993 |
| JP | B2 3082483 | 6/2000 |
| JP | A 2000-238652 | 9/2000 |
| JP | A 2002-2516 | 1/2002 |
| JP | A 2002-104209 | 4/2002 |

* cited by examiner

Primary Examiner—Michael J. Zanelli
(74) Attorney, Agent, or Firm—Oliff & Berridge, PLC

(57) ABSTRACT

A steering control apparatus of the present invention comprises a steering state detector for detecting a steering state of a steering system; a return determining device for detecting a change of the steering state on the steering system by detecting the steering state and thereafter detecting the change of the steering state thus detected, based on the steering state detected by the steering state detector; and a torque imparting device for imparting a torque for returning the steering system to the neutral position, to the steering system when the return determining device detects the change of the steering state. The steering control apparatus of the present invention is able to improve the accuracy of a return decision of the steering system and to suitably impart a return assist torque for returning the steering system to the neutral position.

20 Claims, 5 Drawing Sheets

STEERING CONTROL APPARATUS

BACKGROUND OF THE INVENTION

1. Field of the Invention

The present invention relates to a steering control apparatus for imparting a return torque for returning a steering system to its neutral position.

2. Related Background of the Invention

In automobiles, as friction of a steering system increases or as tire returnability becomes weaker, the friction of the steering system and the tire return force balance each other out up to a larger steer angle, so as to degrade steering wheel returnability. Particularly, where the steering system is equipped with an electric power steering system, the steering wheel returnability becomes more degraded because of friction between gears for transmitting a torque generated by a motor, inertia of the motor, and so on. In order to enhance the steering wheel returnability, some electric power steering systems are configured to impart a return torque for returning the steering wheel to the neutral position when the driver intends to return the steering wheel (Japanese Patent No. 3082483). For making a return decision on whether the driver intends to return the turned steering wheel to the neutral position, a direction of steering torque is compared with a direction of steering angular velocity and it is determined that the driver intends to return the steering wheel, if these two directions are different.

SUMMARY OF THE INVENTION

However, the conventional return decision method sometimes suffered degradation of decision accuracy, which can result in imparting the return torque when not required, or which can fail to impart the return torque when necessary. If the return torque is imparted when not required, the driver must give a steering torque against the return torque. If the return torque is not imparted when needed, it will result in degrading the returnability and worsening driver's steering feeling. In case that the steering angular velocity and the steering torque both are small at small steering angles, it is very difficult to whether the direction of steering torque is different from that of steering angular velocity or not. And in case that the steering torque suddenly decreases at the time of driver's releasing the steering wheel after having turned it, it is also very difficult to determine whether the direction of steering torque is different from that of steering angular velocity or not. An object of the present invention is therefore to provide a steering control apparatus capable of improving the accuracy of the return decision of the steering system.

A steering control apparatus of the present invention comprises steering state detecting means for detecting a steering state of a steering system; return determining means for detecting a change of the steering state on the steering system by detecting the steering state and thereafter detecting the change of the steering state thus detected, based on the steering state detected by the steering state detecting means; and torque imparting means for imparting to the steering system a torque for returning the steering system to a neutral position, when the return determining means detects the change of the steering state.

In this steering control apparatus, the return determining means detects a change of the steering state on the steering system based on the steering state (e.g., a steering angle, a steering angular velocity, or a steering torque) detected by the steering state detecting means. The change of the steering state is detected by detecting the steering state and thereafter detecting the change of that steering state thus detected. Namely, the steering state changes in the steering action on the steering system through driver's steering wheel manipulation, and the steering state thus having changed by the steering action further changes to another different steering state when the driver performs an operation of returning the steering wheel thus turned, to the neutral position. Therefore, a return decision to the neutral position can be made by finding the further steering state change after the steering action to either direction. For example, where the steering angular velocity is adopted, the steering angular velocity increases during a turn of the steering wheel to either direction, and thereafter the steering angular velocity having increased once becomes zero when the steering wheel is switched back to the neutral position.

In the steering control apparatus, when the return determining means detects a change of the steering state (i.e., when it detects a return to the neutral position from the steered state of the steering system), the torque imparting means imparts the torque for returning the steering system (e.g., a steering wheel or steered road-wheels), to improve the returnability of the steering system. In this manner, the steering control apparatus is able to highly accurately detect a return of the steering system from the steered state to the neutral position and to securely impart the torque for assisting the return during the return operation of the steering system to the neutral position. As a result, the return torque is imparted to the steering system only when necessary, so as to improve the steering feeling.

The above steering control apparatus of the present invention may have a configuration wherein the steering state detecting means is steering angular velocity detecting means for detecting a steering angular velocity in the steering system and wherein the return determining means detects a decrease of the steering angular velocity as the change of the steering state. In this steering control apparatus, the steering angular velocity detecting means detects the steering angular velocity as the steering state and the return determining means detects whether the steering angular velocity demonstrates a decrease, as the change of the steering state. Namely, when the steering wheel once turned to either direction is switched back to the neutral position, the steering angular velocity having increased once becomes zero; therefore, a return of the steering wheel can be determined by detecting whether the steering angular velocity demonstrates a decrease.

The above steering control apparatus of the present invention may have a configuration wherein the steering state detecting means is steering angle detecting means for detecting a steering angle in the steering system and wherein the return determining means detects a decrease of the steering angle to the neutral position as the change of the steering state. In this steering control apparatus, the steering angle detecting means detects the steering angle as the steering state and the return determining means detects whether the steering angle demonstrates a decrease to the neutral position, as the change of the steering state. Namely, as the steering wheel once turned to either direction is returned to the neutral position, the steering angle having increased left or right decreases; therefore, a return of the steering wheel can be determined by detecting whether the steering angle demonstrates a decrease to the neutral position.

In the above steering control apparatus of the present invention, the steering state detecting means may be torque detecting means for detecting a torque exerted on the steering system. In this steering control apparatus, the torque detecting means detects the torque exerted on the steering system, as the steering state and the return determining means detects a change of the torque as the change of the steering state.

The above steering control apparatus of the present invention may have a configuration wherein when the steering angle in the steering system is smaller than a predetermined angle, the operation of imparting the torque for returning the steering system to the neutral position is terminated. In this steering control apparatus, when the steering wheel returns to the neutral state, the steering angle becomes equal or close to 0; and, thus, when the steering angle in the steering system becomes smaller than the predetermined angle, it is determined that the steering system is in the neutral state, and the operation of imparting the torque for returning the steering system to the neutral position is terminated, so as to avoid imparting an unnecessary torque to the steering system. The predetermined angle is a small steering angle to indicate that the steering wheel is in or near the neutral state.

The above steering control apparatus of the present invention may have a configuration wherein when the torque on the steering system is smaller than a predetermined torque, the operation of imparting the torque for returning the steering system to the neutral position is terminated. In this steering control apparatus, when the steering wheel is back in the neutral state, the steering torque is small; therefore, when the steering torque on the steering system is smaller than the predetermined torque, it is determined that the steering system is in the neutral state, and the operation of imparting the torque for returning the steering system to the neutral position is terminated, so as to avoid imparting an unnecessary torque to the steering system. The predetermined torque is a small steering torque to indicate that the steering wheel is back in the neutral state.

In the above steering control apparatus of the present invention, preferably, the torque for returning the steering system to the neutral position is smaller at a high vehicle speed than at a low vehicle speed. In this steering control apparatus, the torque for returning the steering system to the neutral position is decreased with increase in the vehicle speed because the returnability of the steering system becomes higher with increase in the vehicle speed.

In the above steering control apparatus of the present invention, preferably, the torque for returning the steering system to the neutral position is larger at a large steering angle in the steering system than at a small steering angle. In this steering control apparatus, the torque for returning the steering system to the neutral position is increased with increase in the steering angle because the required torque for returning the steering system to the neutral position becomes larger with increase in the steering angle.

The above steering control apparatus of the present invention may have a configuration wherein when the torque imparting means continuously imparts the torque for not less than a predetermined time, the operation of imparting the torque for returning the steering system to the neutral position is terminated. In this steering control apparatus, since it is assumed that there is some anomaly if the steering system is not back in the neutral state even after the torque for returning the steering system to the neutral position is continuously imparted, it is determined that there is an abnormality if the torque is continuously imparted for not less than the predetermined time, and the operation of imparting the torque is terminated. This fail-safe mechanism prevents an unnecessary torque from being continuously imparted to the steering system.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

An embodiment of the steering control apparatus according to the present invention will be described below with reference to the drawings. In the present embodiment, the steering control apparatus according to the present invention is applied to an electric power steering system of the column assist type. The electric power steering system of the present embodiment imparts an assist torque to the steering system while the driver turns the steering wheel, and it also imparts a return torque while the driver intends to return the steering wheel to the neutral position (neutral direction). In the present embodiment, directions of angles, angular velocities, and torques are indicated by positive and negative, in such a manner that positive values are taken in the left (counterclockwise) direction and negative values in the right (clockwise) direction.

Figure 1:
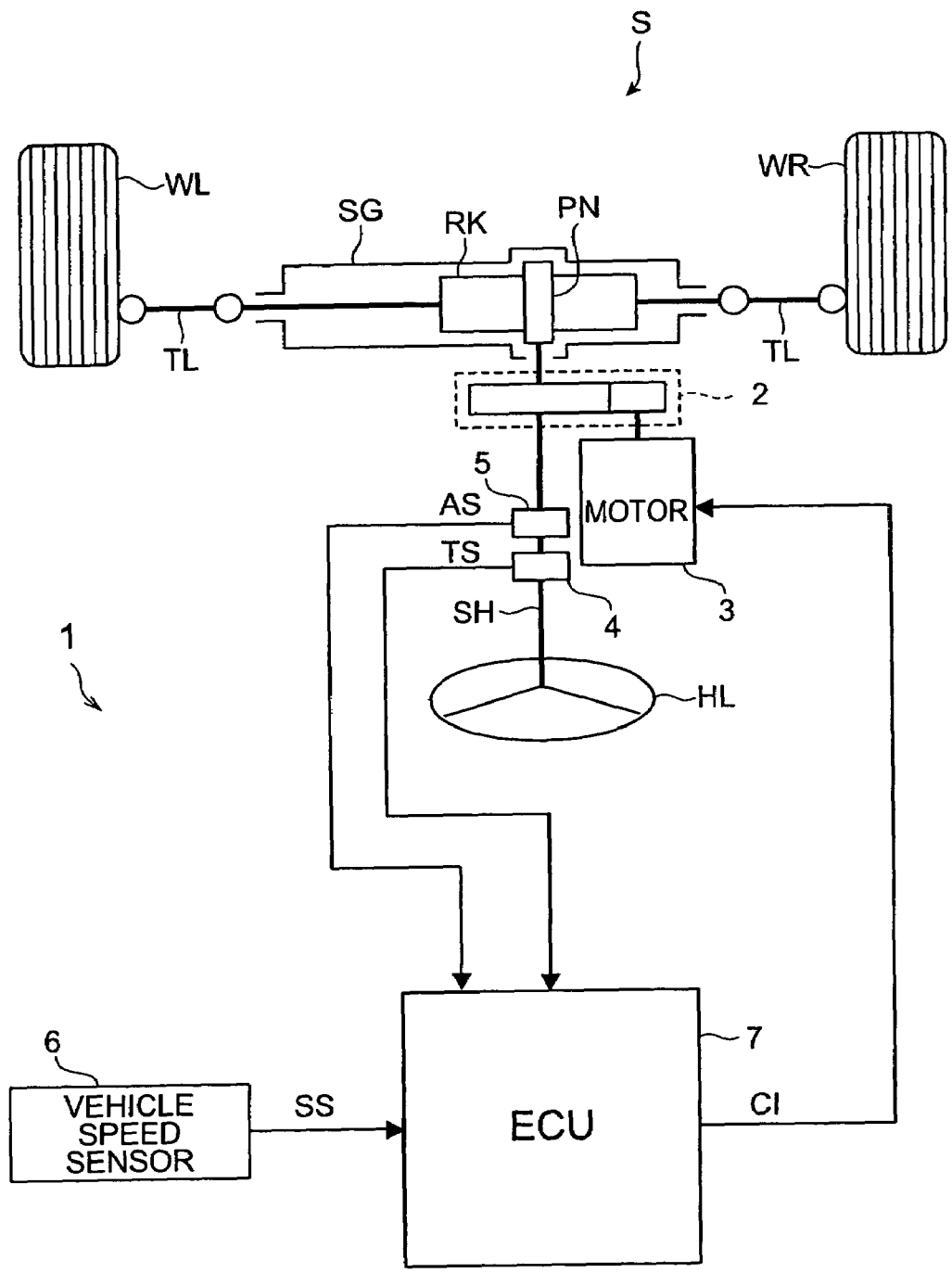
FIG. 1 is a configuration diagram of an electric power steering system according to an embodiment of the present invention.

The electric power steering system 1 will be described with reference to FIG. 1. FIG. 1 is a configuration diagram of the electric power steering system according to the present embodiment. First, let us explain the steering system S on which the electric power steering system 1 acts. In the steering system S, left and right front wheels WL, WR as steered wheels are coupled through tie rods TL, TL to a steering gear box SG. The steering gear box SG is equipped primarily with a rack RK and a pinion PN. The tie rods TL, TL are coupled to the both ends of the rack RK, and the rack RK is arranged to be slidable relative to the steering gear box SG. A steering wheel HL is linked through a steering shaft SH to the pinion PN. Furthermore, this steering system S is provided with the electric power steering system 1. In the steering system S constructed as described above, when the driver exerts a steering effort on the steering wheel HL, a steering torque is imparted to the steering shaft SH. This steering torque rotates the pinion PN, whereby the rack RK slides relative to the steering gear box SG to turn the left and right front wheels WL, WR through the tie rods TL, TL.

The electric power steering system 1 gives the steering system S an assist torque by a motor to assist the driver's steering effort. Furthermore, the electric power steering system 1 gives the steering system S a return torque by the motor to improve the returnability of the steering wheel HL. Particularly, the electric power steering system 1 is able to highly accurately determine whether the driver intends to return the steering wheel HL to the neutral position, and to impart the return torque only when the return torque is necessary. For that, the electric power steering system 1 is provided primarily with a reducer (reduction gear) 2, a motor 3, a steering torque sensor 4, a steering angle sensor 5, a vehicle speed sensor 6, and an ECU [Electronic Control Unit] 7.

The reducer 2 is attached to the intermediate part of the steering shaft SH to transmit the torque generated by the motor 3, to the steering shaft SH. The motor 3 is connected to the ECU 7 and a control current CI controlled by the ECU 7 is supplied to the motor 3. Then the motor 3 is rotationally driven in a direction according to the control current CI to generate a torque according to the control current CI. Incidentally, the motor 3 is equipped with a current sensor (not shown) and a voltage sensor (not shown) to detect a motor current and a motor voltage and to transmit them to the ECU 7.

The steering torque sensor 4 is provided in the intermediate part of the steering shaft SH and is a sensor for detecting the direction and magnitude of a steering torque fed to the steering wheel HL by the driver. The steering torque sensor 4 transmits to the ECU 7 a steering torque signal TS indicating the direction and magnitude of the steering torque. The steering angle sensor 5 is provided in the intermediate part of the steering shaft SH and is a sensor for detecting the direction and magnitude of a steering angle given through the steering wheel HL by the driver. The steering angle sensor 5 transmits to the ECU 7 a steering angle signal AS indicating the direction and magnitude of the steering angle. The vehicle speed sensor 6 consists of four sensor elements provided at the respective four wheels and is a sensor for detecting rotational velocities of the respective wheels. The vehicle speed sensor 6 transmits to the ECU 7 a vehicle speed signal SS indicating the rotational velocities of the wheels. The ECU 7 calculates a vehicle speed on the basis of the rotational velocities of the respective wheels, but it is also possible to use any vehicle speed sensor other than the vehicle speed sensor 6.

Figure 2:
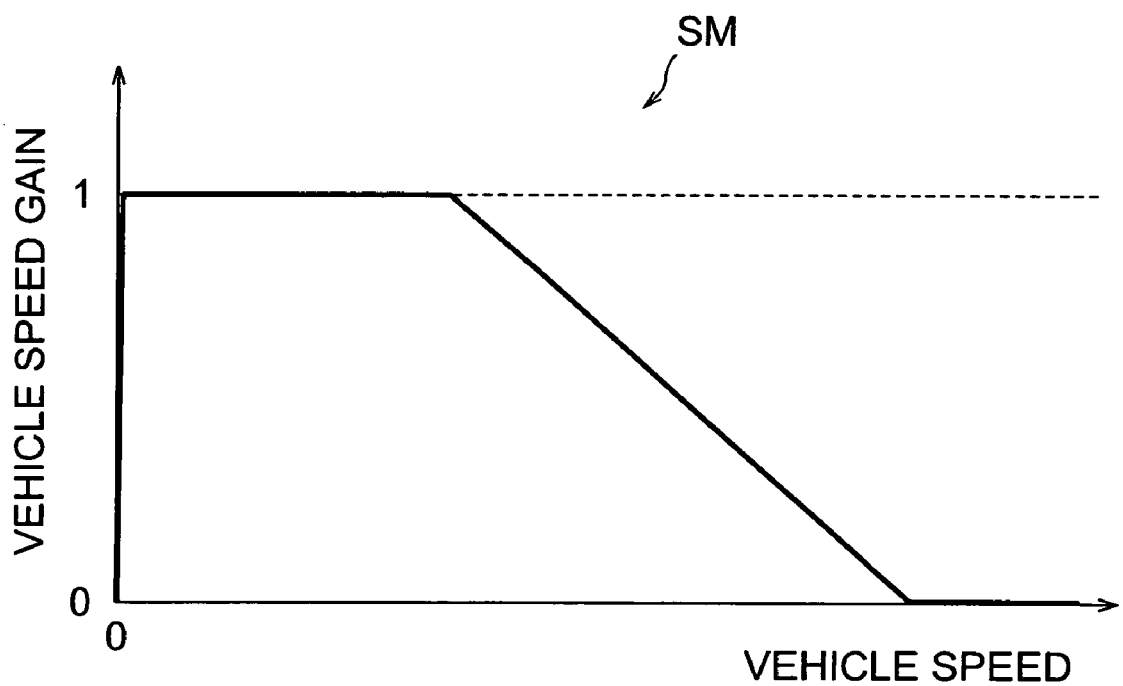
FIG. 2 is a vehicle speed gain map held in ECU of FIG. 1.
Figure 3:
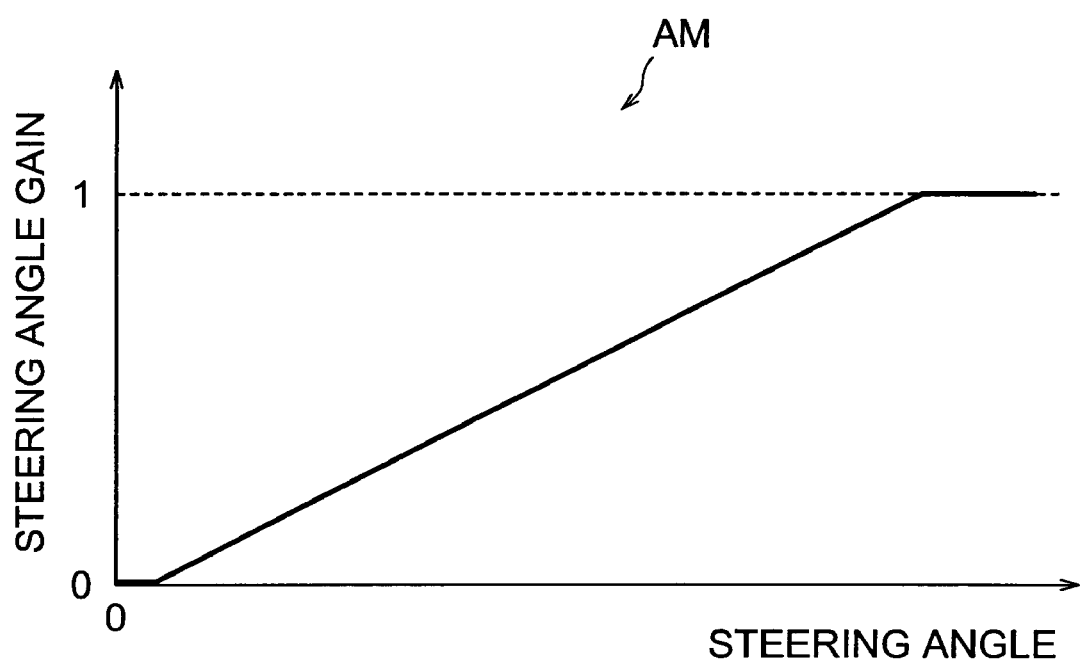
FIG. 3 is a steering angle gain map held in ECU of FIG. 1.

The ECU 7 will be described with reference to FIGS. 2 and 3 as well. FIG. 2 is a vehicle speed gain map held in the ECU of FIG. 1. FIG. 3 is a steering angle gain map held in the ECU of FIG. 1. The ECU 7 is an electronic control unit consisting of a CPU [Central Processing Unit], a ROM [Read Only Memory], a RAM [Random Access Memory], a motor driving circuit, and so on. The ECU 7 performs a steering assist control, a motor control, a steering wheel return control, etc., based on the detection signals TS, AS, and SS from the various sensors 4, 5, and 6, to control the drive of the motor 3.

The steering assist control will be described. The ECU 7 sets an assist torque (its direction and magnitude), mainly based on the vehicle speed from the vehicle speed signal SS and the steering torque from the steering torque signal TS. On this occasion, the ECU 7 calculates the vehicle speed from the rotational velocities of the respective wheels given by the vehicle speed signal SS.

The motor control will be described. The ECU 7 determines a target torque in such a manner that when a return torque is set by the steering wheel return control, the target torque is determined to be the assist torque plus return torque and that when no return torque is set, the target torque is determined to be the assist torque as it is. Then the ECU 7 sets a target current (its direction and magnitude) necessary for generating the direction and magnitude of the target torque. Then the motor driving circuit of the ECU 7 generates the control current CI so as to achieve the target current and supplies the control current CI thus generated, to the motor 3. On this occasion, the ECU 7 performs a feedback control based on a motor current actually flowing in the motor 3, so as to keep the target current.

The steering wheel return control will be described. The ECU 7 first determines whether the steering wheel HL is surely turned to the right or to the left, in order to determine whether the steering wheel return control by the motor 3 should be started. Specifically, in order to judge a steering direction, the ECU 7 determines whether the steering torque based on the steering torque signal TS, and the steering angle and steering angular velocity based on the steering angle signal AS all indicate the same direction. Then the ECU 7 determines that the steering direction is right if the steering torque, steering angle, and steering angular velocity all are negative, determines that the steering direction is left if they all are positive, and forbids a start of the steering wheel return control in the other cases. When it is determined that the steering wheel is turned to either direction, the ECU 7 determines whether a state in which the absolute value of the steering torque is not less than T1, in which the absolute value of the steering angle is not less than $\theta 1$, and in which the absolute value of the steering angular velocity is not less than $\omega 1$, has continued for a time t1, in order to determine whether the degree of steering reaches a level of requiring a return torque.

Then the ECU 7 permits a start of the steering wheel return control if this condition is satisfied, or forbids a start of the steering wheel return control if this condition is not satisfied. T1, $\theta 1$, and $\omega 1$ are values enabling the ECU to determine whether the driver surely turns the steering wheel HL to either direction, and values indicating that the degree of steering reaches the level of requiring the return torque. The use of the steering torque and steering angular velocity in the determination in this manner, in addition to the steering angle by the steering angle sensor 5 which may have a problem of deviation of the neutral position, permits the ECU to highly accurately determine whether the steering action is done. The ECU 7 calculates the steering angular velocity, based on the steering angle signal AS.

When permitting a start of the steering wheel return control, the ECU 7 determines whether the driver intends to return the steering wheel HL from a state in which the steering wheel HL is turned to either direction, to the neutral position. Specifically, the ECU 7 determines whether the absolute value of the steering angular velocity is smaller than $\omega 2$. When it is smaller, the ECU 7 transfers to a process of determining a steering wheel return control amount. Since the steering angular velocity once becomes 0 in a return of the steering wheel HL, the ECU determines that a return to the neutral position has started, if the steering angular velocity becomes 0 or a value extremely close to 0, and starts imparting the return torque. $\omega 2$ is a value that can determine that the steering angular velocity is 0 or a small value extremely close to 0. By detecting that the steering angular velocity over $\omega 1$ decreased once to 0 in this manner, it is feasible to securely determine a start of the return to the neutral position. Furthermore, by detecting a change of the steering state by the change of the steering angular velocity, a start of the return to the neutral position can be determined even in the case where the steering torque suddenly decreases because of release of the steering wheel, and it does not have to be determined that the direction of the steering torque is different from the direction of the steering angular velocity. Therefore, a start of a return to the neutral position can be determined even in cases of small steering angles.

When determining a start of a return to the neutral position, the ECU 7 carries out a process of making an end decision on the process of obtaining the steering wheel return control amount, before obtaining the steering wheel return control amount. Specifically, in order to determine whether the steering wheel HL is back up to a steering angle without need for a further return (near the neutral state), the ECU 7 determines whether the absolute value of the steering angle is smaller than θ2 (<θ1). When it is smaller than θ2, the ECU ends the process of obtaining the steering wheel return control amount. θ2 is a very small value indicating that the steering wheel HL is in the neutral state or near the neutral state. Furthermore, as a fail-safe operation, the ECU 7 determines whether the process of obtaining the steering wheel return control amount with the absolute value of the steering torque being smaller than T2 (<T1) has continued for a time t2 or more. With such continuation of that state, the ECU terminates the process of obtaining the steering wheel return control amount.

The reason for it is that the steering torque should be small with the steering wheel HL being in the neutral state and it is considered that there is a possibility of occurrence of some abnormality if the process of obtaining the steering wheel return control amount continues for the predetermined time (t2 herein) or more in the small state of the steering torque. T2 is a very small value of steering torque indicating that the steering wheel HL is back in the neutral state or near the neutral state. Furthermore, as a fail-safe operation, the ECU 7 determines whether the process of obtaining the steering wheel return control amount has continued for a time t3 (>t2) or more. With such continuation, the ECU terminates the process of obtaining the steering wheel return control amount. The reason for it is that there is a possibility of occurrence of some abnormality if the steering wheel HL is not back into the neutral state even after continuously imparting the steering wheel return torque over such a long time. t3 is a time indicating a duration much longer than a sufficient time necessary for the return of the steering wheel HL to the neutral state.

For obtaining the steering wheel return control amount, the ECU 7 first sets a vehicle speed gain (0–1) from the vehicle speed gain map SM, based on the vehicle speed (cf. FIG. 2). The vehicle speed gain map SM is preliminarily obtained from the characteristics of the steering system S or the like and stored in the ROM. Since the returnability of the steering wheel HL becomes lower at low speeds and higher at high speeds, the vehicle speed gain is set to a large value (=1) at low speeds, but is set to a value reduced as the vehicle speed increases.

Then the ECU 7 determines a steering angle gain (0–1) from the steering angle gain map AM, based on the steering angle (cf. FIG. 3). The steering angle gain map AM is preliminarily obtained from the characteristics of the steering system S or the like and stored in the ROM. Since a greater return torque becomes necessary with increase in the steering angle, the steering angle gain is set to a value increased with increase in the steering angle. In addition, since it is not necessary to impart a return torque with the steering wheel HL being in the vicinity of the neutral state, the steering angle gain is set to 0 in a region where the steering angle is close to 0 (in a region where the steering angle is not more than an angle a little larger than θ2), in order to set a blind zone. Then the ECU 7 multiplies a basic return torque by the vehicle speed gain and the steering angle gain to obtain a return torque (steering wheel return control amount). The basic return torque is a maximum return torque, which is preliminarily obtained from the steering wheel returnability in the steering system S or the like and stored in the ROM.

In the present embodiment the steering torque sensor 4 corresponds to the torque detecting means (steering state detecting means) as set forth in the claims, the steering angle sensor 5 to the steering angle detecting means (steering state detecting means) as set forth in the claims, the steering angular velocity calculating process in the steering angle sensor 5 and the ECU 7 to the steering angular velocity detecting means (steering state detecting means) as set forth in the claims, a part of the steering wheel return control in the ECU 7 to the return determining means as set forth in the claims, and a part of the steering wheel return control in the reducer 2, motor 3, and ECU 7 to the torque imparting means as set forth in the claims.

Figure 4:
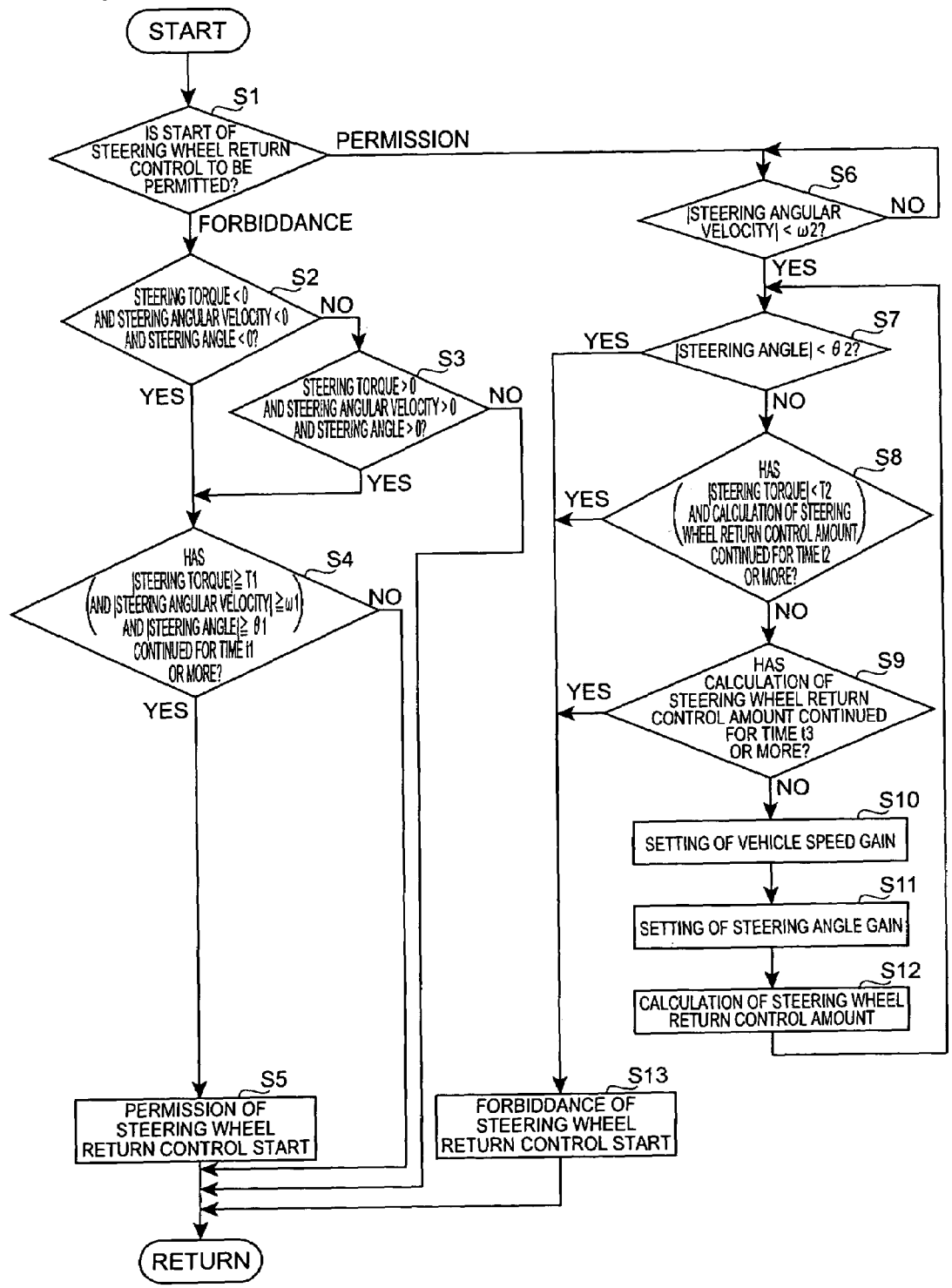
FIG. 4 is a flowchart showing a steering wheel return control in ECU of FIG. 1.

The operation of the electric power steering system 1 will be described with reference to FIGS. 1 to 3. Particularly, the steering wheel return control in the ECU 7 will be described along the flowchart shown in FIG. 4. FIG. 4 is a flowchart showing the steering wheel return control in the ECU of FIG. 1. The description herein concerns a case where, in order to turn left at an intersection during running at some speed, the driver turns the steering wheel HL to the left and thereafter returns the steering wheel HL to the neutral state.

When the driver exerts a steering effort on the steering wheel HL, a steering torque is imparted to the steering shaft SH. The steering torque sensor 4 detects this steering torque and transmits the steering torque signal TS to the ECU 7. The steering angle sensor 5 detects the steering angle and transmits the steering angle signal AS to the ECU 7. Since the driver is turning the steering wheel to the left herein, the steering torque, steering angle, and steering angular velocity all have certain positive values. The vehicle speed sensor 6 detects each of rotational velocities of the respective wheels and transmits the vehicle speed signal SS to the ECU 7. The ECU 7 calculates a vehicle speed from the rotational velocities thus detected.

First, the ECU 7 determines whether a start of the steering wheel return control should be permitted (S1). Incidentally, the default is to forbid a start of the steering wheel return control. In the default case or in the case where forbiddance of a start is set in the process of S13 described later, the ECU 7 determines whether the steering torque is smaller than 0, and whether the steering angular velocity is smaller than 0, and whether the steering angle is smaller than 0 (i.e., whether the driver is turning the steering wheel HL to the right) (S2). When the condition of S2 is satisfied, the ECU moves to the process of S4. When the condition of S2 is not satisfied, the ECU moves to the process of S3.

Since the driver is turning the steering wheel to the left herein, the condition of S2 is not satisfied. Then, the ECU 7 determines whether the steering torque is larger than 0, and whether the steering angular velocity is larger than 0, and whether the steering angle is larger than 0 (i.e., whether the driver is turning the steering wheel HL to the left) (S3). When the condition of S3 is satisfied, the ECU moves to the process of S4. When the condition of S3 is not satisfied, the ECU returns to the process of S1. Since the driver is turning the steering wheel to the left herein, the ECU 7 moves to the process of S4 to determine whether the condition that the absolute value of the steering torque is not less than T1 and that the absolute value of the steering angular velocity is not less than ω1 and that the absolute value of the steering angle is not less than θ1 has continued for the time t1 or more (S4). When the condition of S4 is satisfied, the ECU permits a start of the steering wheel return control (S5). When the condition of S4 is not satisfied, the ECU returns to the process of S1. The description herein concerns the example of steering to the left, but the ECU also moves to the process of S4 in the case of steering to the right with yes at S2.

Since the condition of S4 is not satisfied during a start period of steering, the ECU 7 continuously determines forbiddance of a start of the steering wheel return control in the determination at S1 and does not calculate the steering wheel return control amount (return torque). Therefore, the ECU 7 sets the assist torque itself as a target torque and sets a target current according to this target torque. In passing, the ECU 7 sets the assist torque on the basis of the steering torque, vehicle speed, and so on. Then the ECU 7 supplies the control current CI to the motor 3 so as to achieve the target current by feedback control. When the control current CI is supplied to the motor 3, the motor 3 is rotationally driven to impart a torque according to the control current CI through the reducer 2 to the steering shaft SH. Therefore, in addition to the steering torque on the steering wheel HL by the driver, the assist torque by the motor 3 is applied to the steering shaft SH. For this reason, the driver is able to turn the steering wheel HL by applying only a small steering force.

After the driver continuously has given the steering effort for the predetermined time since the start of the steering to the left so as to satisfy the condition of S4, the ECU 7 permits a start of the steering wheel return control (S5). Then the ECU 7 determines in the determination process at S1 that a start of the steering wheel return control is permitted, and moves to the process of S6. Then the ECU 7 determines whether the absolute value of the steering angular velocity is smaller than ω2 (S6). When it is smaller than ω2, the ECU moves to the process of S7. When it is not smaller than ω2, the ECU returns to the process of S6. Since the steering angular velocity does not take 0 before the driver moves into a steering wheel operation of returning the steering wheel from the steering to the left to the neutral position, the ECU 7 repetitively executes the determination process at S6. In this case, since the ECU 7 does not calculate the return torque, the motor 3 imparts only the assist torque to the steering shaft SH.

When in due time the driver moves into the steering wheel operation of returning the steering wheel from the steering to the left to the neutral position, the steering angular velocity once becomes 0 to satisfy the condition of S6, and then the ECU 7 moves to the process of S7. The ECU 7 determines whether the absolute value of the steering angle is smaller than θ2 (S7). When it is smaller than θ2, the ECU 7 forbids a start of the steering wheel return control (i.e., it terminates the process of calculating the steering wheel return control amount) (S13). When it is not smaller than θ2, the ECU moves to the process of S8.

When the condition of S7 is not satisfied, the ECU 7 determines whether the state in which the absolute value of steering torque is smaller than T2 and in which the steering wheel return control amount is calculated, has continued for the time t2 or more (S8). When the condition of S8 is satisfied, the ECU forbids a start of the steering wheel return control (S13). When the condition of S8 is not satisfied, the ECU moves to the process of S9. When the condition of S8 is not satisfied, the ECU 7 determines whether the state in which the steering wheel return control amount is calculated, has continued for the time t3 or more (S9). When the condition of S9 is satisfied, the ECU forbids a start of the steering wheel return control (S13). When the condition of S9 is not satisfied, the ECU moves to the process of S10.

When neither the end conditions of S7 to S9 is met, the ECU 7 sets a vehicle speed gain according to the vehicle speed from the vehicle speed gain map SM (S10) and then sets a steering angle gain according to the steering angle from the steering angle gain map AM (S11). Then the ECU 7 multiplies the basic return torque by the vehicle speed gain and the steering angle gain to obtain a steering wheel return control amount (return torque) (S12). After the calculation, the ECU 7 returns to the process of S7. In this manner, the ECU 7 continues to calculate the steering wheel return control amount until any one of the end conditions of S7 to S9 is satisfied.

When the return torque is calculated, the ECU 7 adds the return torque to the assist torque to obtain a target torque. Then the ECU 7 sets a target current according to this target torque and supplies the control current CI to the motor 3. Accordingly, the motor 3 also imparts the return torque as well as the assist torque to the steering shaft SH. For this reason, the returnability of the steering wheel HL is improved, so that the steering wheel HL is smoothly returned by the optimal return torque according to the steering angle and the vehicle speed. When the steering wheel HL is returned to the neutral state in due time, the ECU 7 determines that the absolute value of the steering angle is smaller than θ2 (S7), and then forbids a start of the steering wheel return control (S13). Then the ECU 7 terminates the calculation of the steering wheel return control amount to end the operation of imparting the return torque by the motor 3.

The electric power steering system 1 is configured to use the three elements (steering torque, steering angular velocity, and steering angle) indicating the steering state, to securely determine steering to either direction and to detect the change of the steering angular velocity to determine a return from the steered state to the neutral position. Consequently, it is able to determine a return of the steering wheel with high accuracy and to impart the return torque only when the return torque is needed. Furthermore, the electric power steering system 1 is configured to set the return torque according to the vehicle speed and the steering angle, whereby it is able to impart the optimal return torque. This results in improving the returnability of the steering wheel HL and improving the driver's steering feeling.

An embodiment of the present invention was described above, but the present invention can be carried out in various forms without having to be limited to the above embodiment. For example, the present invention was applied to an automobile equipped with the electric power steering system in the present embodiment, but the present invention is also applicable to automobiles with a hydraulic power steering system or automobiles without any power steering system. In addition, the present invention was applied to the electric power steering system of the column assist type in the present embodiment, but the present invention is also applicable to other electric power steering systems such as those of the rack assist type.

In the present embodiment the steering control apparatus was configured to impart the return torque for returning the steering wheel to the neutral position, but the apparatus may also be configured to impart a return torque for returning another component forming the steering system, e.g., the steered wheels, to its neutral position. The present embodiment adopted the configuration wherein the steering direction was detected by the steering angle, the steering torque, and the steering angular velocity, but it is also possible to adopt any other configuration such as detection by two of those. The present embodiment adopted the configuration wherein the change of the steering state was detected by the steering angular velocity becoming 0 (in fact, it was determined by detecting that the steering angular velocity became smaller than ω2). However, it is also possible to adopt a configuration wherein the change of the steering state is detected by detecting a change of the steering angle or the steering torque.

Figure 5:
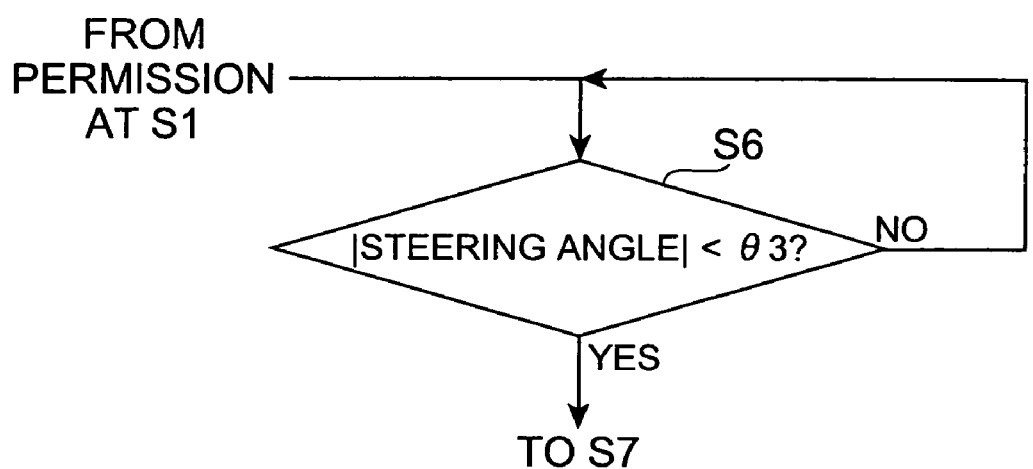
FIG. 5 is an alternative step in the flowchart of FIG. 4

FIG. 5 shows a flowchart where the steering state change is detected based on the steering angle. FIG. 5 shows S6 replacing S6 in the flowchart of FIG. 4. The other processes are similar to those in the flowchart of FIG. 4. At S6 in FIG. 5, it is determined whether the absolute value of the steering angle is smaller than a predetermined angle θ3 (θ2<θ3<θ1). When the absolute value of the steering angle is smaller than the predetermined angle θ3, it is determined that the driver intends to return the steering system to the neutral position. When the absolute value of the steering angle becomes smaller than θ3 (<θ1) after yes at S4 (where the absolute value of the steering angle is not less than θ1), it can be determined that the steering system is to be returned. After yes at S6, the ECU moves to the aforementioned processes at and after S7.

The present embodiment adopted the configuration wherein the vehicle speed gain decreased toward the high vehicle speed range and wherein the steering angle gain increased toward the large steering angle range. However, it is also possible to appropriately set the vehicle speed gain and the steering angle gain in consideration of the properties in the steering system, the other controls, and so on. The present embodiment adopted the configuration wherein the return torque was set according to the vehicle speed and the steering angle, but it is also possible to adopt a configuration wherein the return torque is set also taking other parameters such as the steering angular velocity into consideration. The present embodiment adopted the configuration wherein the return torque was determined by setting the vehicle speed gain and the steering angle gain and multiplying the basic return torque by each of those gains. However, it is also possible to employ another determining method, e.g., a method of setting the basic return torque according to the steering angle and varying it according to the vehicle speed.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering control apparatus comprising:
    steering state detecting means for detecting a steering state of a steering system;
    return determining means for detecting a change of the steering state on the steering system, based on the steering state detected by the steering state detecting means; and
    torque imparting means for imparting to the steering system a torque for returning the steering system to a neutral position, when the return determining means detects the change of the steering state,
    wherein the steering state detecting means detects the steering state on the basis of a steering angle and a steering angular velocity of the steering system and the torque on the steering system.

2. The steering control apparatus according to claim 1, wherein the steering state detecting means is steering angular velocity detecting means for detecting a steering angular velocity of the steering system, and
    wherein the return determining means detects a decrease of the steering angular velocity as the change of the steering state.

3. The steering control apparatus according to claim 2, wherein the return determining means detects a decrease of the steering angular velocity to below a predetermined angular velocity as the change of the steering state.

4. The steering control apparatus according to claim 3, wherein the steering state detecting means detects a steering angular velocity of a steering wheel.

5. The steering control apparatus according to claim 1, wherein the steering state detecting means is steering angle detecting means for detecting a steering angle of the steering system, and
    wherein the return determining means detects a decrease of the steering angle to the neutral position as the change of the steering state.

6. The steering control apparatus according to claim 5, wherein the return determining means detects a decrease of the steering angle to below a predetermined angle as the change of the steering state.

7. The steering control apparatus according to claim 6, wherein the steering state detecting means detects a steering angle of a steering wheel.

8. The steering control apparatus according to claim 6, wherein the steering state detecting means detects a steered angle of steered road-wheels as the steering angle.

9. The steering control apparatus according to claim 1, wherein the steering state detecting means is torque detecting means for detecting a torque exerted on the steering system.

10. The steering control apparatus according to claim 1, wherein when a steering angle of the steering system becomes less than a predetermined angle, the torque imparting means terminates imparting the torque for returning the steering system to the neutral position.

11. The steering control apparatus according to claim 1, wherein when the torque on the steering system becomes less than a predetermined torque, the torque imparting means terminates imparting the torque for returning the steering system to the neutral position.

12. The steering control apparatus according to claim 11, wherein when the torque on the steering system is smaller than the predetermined torque and when the torque imparting means is imparting the torque, the torque imparting means terminates imparting the torque for returning the steering system to the neutral position.

13. The steering control apparatus according to claim 12, wherein when it is determined that a state in which the torque on the steering system is smaller than the predetermined torque and in which the torque imparting means is imparting the torque, has continued for a predetermined time or more, the torque imparting means terminates imparting the torque for returning the steering system to the neutral position.

14. The steering control apparatus according to claim 1, wherein the torque imparting means sets the torque for returning the steering system to the neutral position, so as to be smaller at a high vehicle speed than at a low vehicle speed.

15. The steering control apparatus according to claim 14, wherein the torque imparting means sets a coefficient smaller at a high vehicle speed than at a low vehicle speed and multiplies a given torque preliminarily determined, by the coefficient, thereby determining the torque for returning the steering system to the neutral position.

16. The steering control apparatus according to claim 1, wherein the torque imparting means sets the torque for returning the steering system to the neutral position so as to be larger at a large steering angle in the steering system than at a small steering angle.

17. The steering control apparatus according to claim 16, wherein the torque imparting means sets a coefficient larger at a large steering angle in the steering system than at a small steering angle and multiplies a given torque preliminarily determined, by the coefficient, thereby determining the torque for returning the steering system to the neutral position.

18. The steering control apparatus according to claim 1, wherein when it is determined that the torque imparting means continuously has imparted the torque for a predetermined time or more, the torque imparting means terminates imparting the torque for returning the steering system to the neutral position.

19. A steering control apparatus comprising:
- steering state detecting means for detecting a steering state of a steering system;
- return determining means for detecting a change of the steering state on the steering system, based on the steering state detected by the steering state detecting means; and
- torque imparting means for imparting to the steering system a torque for returning the steering system to a neutral position, when the return determining means detects the change of the steering state,
- wherein when it is determined that the torque imparting means continuously has imparted the torque for a predetermined time or more, the torque imparting means terminates imparting the torque for returning the steering system to the neutral position.

20. A steering control apparatus comprising:
- steering state detecting means for detecting a steering state of a steering system;
- return determining means for detecting a change of the steering state on the steering system, based on the steering state detected by the steering state detecting means; and
- torque imparting means for imparting to the steering system a torque for returning the steering system to a neutral position, when the return determining means detects the change of the steering state,
- wherein when the torque on the steering system becomes less than a predetermined torque, the torque imparting means terminates imparting the torque for returning the steering system to the neutral position.

* * * * *